US009756022B2

(12) United States Patent
Amiri et al.

(10) Patent No.: US 9,756,022 B2
(45) Date of Patent: Sep. 5, 2017

(54) ENHANCED REMOTE KEY MANAGEMENT FOR AN ENTERPRISE IN A CLOUD-BASED ENVIRONMENT

(71) Applicant: Box, Inc., Redwood City, CA (US)

(72) Inventors: Kia Amiri, San Francisco, CA (US); Jeff Queisser, San Francisco, CA (US); Chris Byron, San Francisco, CA (US); Rand Wacker, San Francisco Bay, CA (US); Kevin Babcock, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 14/472,540

(22) Filed: Aug. 29, 2014

(65) Prior Publication Data

US 2016/0065363 A1    Mar. 3, 2016

(51) Int. Cl.
  *H04L 29/06*    (2006.01)
  *H04L 9/08*    (2006.01)
  *G06F 21/60*    (2013.01)

(52) U.S. Cl.
  CPC ........ *H04L 63/0428* (2013.01); *H04L 9/0822* (2013.01); *H04L 9/0897* (2013.01); *H04L 63/06* (2013.01); *G06F 21/60* (2013.01); *H04L 2209/24* (2013.01); *H04L 2209/60* (2013.01)

(58) Field of Classification Search
  CPC ............... H04L 63/0428–63/064; G06F 21/60
  See application file for complete search history.

(56) References Cited

U.S. PATENT DOCUMENTS

| 5,787,175 | A | 7/1998 | Carter |
|---|---|---|---|
| 5,799,320 | A | 8/1998 | Klug |
| 5,848,415 | A | 12/1998 | Guck |
| 5,864,870 | A | 1/1999 | Guck |
| 5,999,908 | A | 12/1999 | Abelow |
| 6,016,467 | A | 1/2000 | Newsted et al. |
| 6,034,621 | A | 3/2000 | Kaufman |

(Continued)

FOREIGN PATENT DOCUMENTS

| CA | 2724521 | 11/2009 |
|---|---|---|
| CN | 101997924 | 3/2011 |

(Continued)

OTHER PUBLICATIONS

Final Office Action dated Oct. 13, 2015 for U.S. Appl. No. 14/670,312.

(Continued)

*Primary Examiner* — Carl Colin
*Assistant Examiner* — Gary Lavelle
(74) *Attorney, Agent, or Firm* — Vista IP Law Group, LLP

(57) ABSTRACT

Systems and methods are disclosed for facilitating remote key management services in a collaborative cloud-based environment. In one embodiment, the remote key management architecture and techniques described herein provide for local key encryption and automatic generation of a reason code associated with content access. The reason code is logged by a hardware security module which is monitored by a remote client device (e.g., an enterprise client) to control a second (remote) layer of key encryption. The remote client device provides client-side control and configurability of the second layer of key encryption.

24 Claims, 9 Drawing Sheets

(56) References Cited

U.S. PATENT DOCUMENTS

| | | | |
|---|---|---|---|
| 6,055,543 A | 4/2000 | Christensen et al. |
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,356,941 B1 * | 3/2002 | Cohen ............... G06F 21/6272 |
| | | 709/219 |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B2 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114205 A1 | 5/2005 | Nelson et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |

(56) References Cited

U.S. PATENT DOCUMENTS

| | | |
|---|---|---|
| 2006/0053380 A1 | 3/2006 | Spataro et al. |
| 2006/0066902 A1 | 3/2006 | Matsui et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0149416 A1* | 7/2006 | Mohapatra ............ G06F 19/322 700/242 |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283411 A1 | 12/2007 | Paramasivam et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0049942 A1 | 2/2008 | Sprunk et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0103972 A1* | 5/2008 | Lanc ..................... G06Q 20/32 705/44 |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0279533 A1 | 11/2008 | Buttars |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0023776 A1 | 1/2010 | Fedronic et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0070769 A1* | 3/2010 | Shima ................. G06F 11/3476 713/171 |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218233 A1 | 8/2010 | Henderson et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |

(56) References Cited

U.S. PATENT DOCUMENTS

| | | |
|---|---|---|
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0119732 A1 | 5/2011 | Dunn |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179909 A1 | 7/2012 | Sagi et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0311696 A1* | 12/2012 | Datsenko ............ G06F 21/6218 726/17 |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007450 A1 | 1/2013 | Janyavula et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124371 A1 | 5/2013 | Mehta et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179676 A1 | 7/2013 | Hamid |
| 2013/0185347 A1 | 7/2013 | Romano |
| 2013/0185558 A1 | 7/2013 | Seibert et al. |
| 2013/0191233 A1 | 7/2013 | Atkinson et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |

(56) References Cited

U.S. PATENT DOCUMENTS

| | | |
|---|---|---|
| 2013/0246932 A1 | 9/2013 | Zaveri et al. |
| 2013/0251146 A1 | 9/2013 | Roelse |
| 2013/0262210 A1 | 10/2013 | Savage et al. |
| 2013/0262862 A1 | 10/2013 | Hartley |
| 2013/0266138 A1 | 10/2013 | Mantri et al. |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0075198 A1 | 3/2014 | Pierce et al. |
| 2014/0150023 A1 | 5/2014 | Gudorf et al. |
| 2014/0156373 A1 | 6/2014 | Roberts et al. |
| 2014/0164776 A1 | 6/2014 | Hook et al. |
| 2014/0172595 A1 | 6/2014 | Beddow et al. |
| 2014/0195807 A1 | 7/2014 | Bar-El et al. |
| 2014/0229729 A1 | 8/2014 | Roth et al. |
| 2014/0270178 A1* | 9/2014 | Kiang .................. H04L 9/0822 380/281 |
| 2014/0304167 A1 | 10/2014 | Atkinson et al. |
| 2014/0380054 A1* | 12/2014 | Roth .................... H04L 9/0822 713/171 |
| 2015/0082041 A1 | 3/2015 | Cuevas |
| 2015/0134953 A1* | 5/2015 | Seaborn .............. H04L 9/0861 713/168 |
| 2015/0143180 A1* | 5/2015 | Dawson ............. G06F 11/3636 714/38.1 |
| 2015/0244716 A1* | 8/2015 | Potlapally ........... H04L 63/064 713/155 |

FOREIGN PATENT DOCUMENTS

| | | |
|---|---|---|
| CN | 102264063 | 11/2011 |
| CN | 102264063 A | 11/2011 |
| EP | 0348614 A2 | 1/1990 |
| EP | 0921661 | 6/1999 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| GB | 2507191 A | 4/2014 |
| JP | 09-101937 | 4/1997 |
| JP | 11-025059 | 1/1999 |
| JP | 2003273912 | 9/2003 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12 pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.

(56) References Cited

OTHER PUBLICATIONS

Exam Report for EP 13185269.1, Applicant: Box, Inc. Mailed Feb. 13, 2015, 8 pages.
U.S. Appl. No. 14/531,035, filed Jul. 3, 2014 (Not attached herewith).
Non-Final Office Action for U.S. Appl. No. 14/670,312 dated Jun. 25, 2015.
"Average Conversion Time for a D60 RAW file?" http://www.dpreview.com, Jul. 22, 2002, 4 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com. Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
"Understanding Metadata," National Information Standards Organization, NISO Press, 2004, 20 pages.
Burns, "Developing Secure Mobile Applications for Android," Oct. 2008, Version 1.0, 1-28 pages.
Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Conner, "Google Apps: The Missing Manual," published by O'Reilly Media, May 27, 2008, 24 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13158415.3, Applicant: Box, Inc. Mailed Jun. 4, 2013, 8 pages.
Exam Report for EP13168784.0, Applicant: Box, Inc. Mailed Nov. 21, 2013, 7 pages.
Exam Report for EP13177108.1, Applicant: Box, Inc. Mailed May 26, 2014 6 pages.
Exam Report for EP13185269.1, Applicant: Box, Inc. Mailed Jan. 28, 7 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
Exam Report for GB1308842.2, Applicant: Box, Inc. Mailed Mar. 10, 2014, 4 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 23, 2013, 5 pages.
Exam Report for GB1312095.1, Applicant: Box, Inc. Mailed Dec. 12, 2013, 7 pages.
Exam Report for GB1312264.3, Applicant: Box, Inc. Mailed Mar. 24, 2014, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1314771.5, Applicant: Box, Inc. Mailed Feb. 17, 2014, 7 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1318792.7, Applicant: Box, Inc. Mailed May 22, 2014, 2 pages.
Exam Report for GB1320902.8, Applicant: Box, Inc. Mailed Dec. 20, 2013, 6 pages.
Exam Report for GB1410569.6 Applicant: Box, Inc. Mailed Jul. 11, 2014, 9 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012. pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/034765, Applicant: Box, Inc., Mailed Jan. 20, 2014, 15 pages.
International Search Report and Written Opinion for PCT/US2013/035404, Applicant: Box, Inc., Mailed Jun. 26, 2013, 11 pages.

(56) References Cited

OTHER PUBLICATIONS

International Search Report and Written Opinion for PCT/US2013/039782, Applicant: Box, Inc., Mailed Aug. 28, 2013, 15 pages.
Internet Forums, http://web.archive.org/web/20100528195550/http://en.wikipedia.org/wiki/Internet_forums, Wikipedia, May 30, 2010. pp. 1-20.
John et al., "Always Sync Support Forums—View topic—Allway sync funny behavior," Allway Sync Support Forum at http://synccenter.com, Mar. 28, 2011, XP055109680, 2 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav. Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. Mailed May 8, 2014, 5 pages.
Patent Court Document of Approved Judgment for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. Mailed Feb. 7, 2014, 9 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Sommerer, "Presentable Document Format: Improved on-demand PDF to HTML Conversion," retrieved from the internet, http://research.microsoft.com, Nov. 2004, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Foreign Office Action dated Apr. 26, 2016 for United Kingdom Appln. No. 1515196.2.

* cited by examiner

ENHANCED REMOTE KEY MANAGEMENT FOR AN ENTERPRISE IN A CLOUD-BASED ENVIRONMENT

CROSS-REFERENCE TO RELATED APPLICATION

The present application is related to U.S. patent application Ser. No. 14/056,899 titled "REMOTE KEY MANAGEMENT IN A CLOUD-BASED ENVIRONMENT", which claims priority to and benefit from U.S. Provisional Patent Application Ser. No. 61/715,208 titled "ADAPTIVE ARCHITECTURES FOR ENCRYPTION KEY MANAGEMENT IN A CLOUD-BASED ENVIRONMENT", filed on Oct. 17, 2012, the content of which are incorporated by reference herein.

BACKGROUND

As electronic and digital content use in enterprise settings and/or other organizational settings has become the preferred mechanism for project, task, and work flow management, so has the need for streamlined collaboration and sharing of digital content and documents. In such collaboration environments, multiple users share, access, and otherwise perform actions or tasks on content and files in shared workspaces. This shared access and collaboration requires high availability of the data (e.g., an unfettered ability to download and upload files) as any number of users may have access to a file at any given time.

The collaboration environments can include features or mechanisms that add security mechanisms to the access of content and files in the shared workspaces. Unfortunately, these mechanisms do not provide variable client-level control of the security mechanism and thus a need exists for a system that overcomes the above problems, as well as one that provides additional benefits.

Overall, the examples herein of some prior or related systems and their associated limitations are intended to be illustrative and not exclusive. Other limitations of existing or prior systems will become apparent to those of skill in the art upon reading the following.

DETAILED DESCRIPTION

Figure 1:
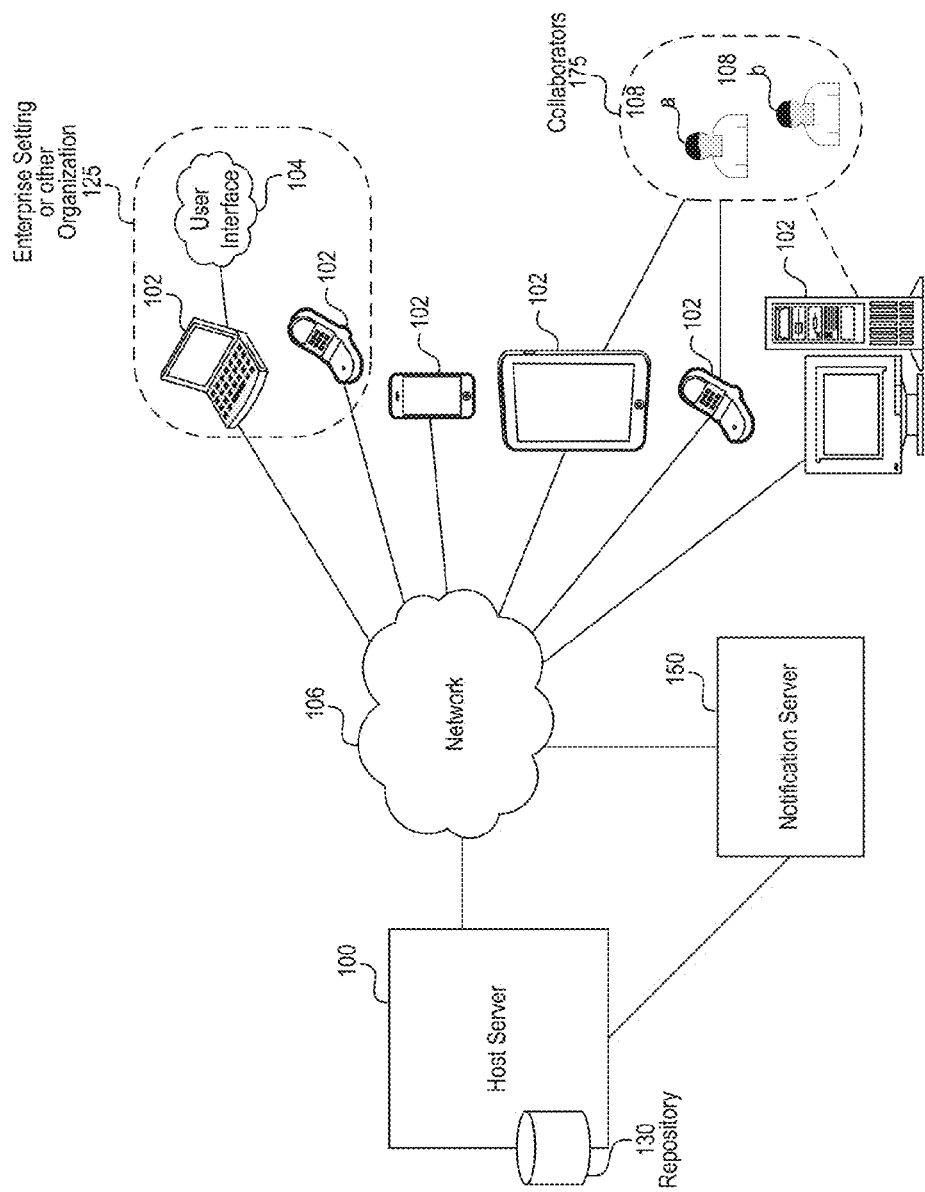
FIG. 1 illustrates an example diagram of a system having a host server of a cloud service and/or cloud storage accounts with capabilities that facilitate remote key management services.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Collaboration environments can include features or mechanisms that provide security through the use of data item (or file) encryption. The file encryption features can, for example, include encrypting an encryption key used that is used to encrypt a data or content item (e.g., a file). As discussed above, existing mechanisms that provide security through data encryption do not provide for client-side (e.g., enterprise-side) control and configurability.

Embodiments of the present disclosure include systems and methods for facilitating remote key management services in a collaborative cloud-based environment using a hardware security module (HSM). More specifically, the remote key management architecture and techniques described herein provide for local key encryption and automatic generation of audit log information. The audit information can include a reason code and/or metadata associated with content access. The reason code enumerates a user behavior performed on the data item in the collaborative cloud-based environment. The audit information is included in a secure key request to the HSM which logs the audit information for monitoring by an enterprise client.

At least some of the audit information is logged by the HSM and monitored by an enterprise (or remote) client to control a second (remote) layer of key encryption at the HSM. More specifically, the enterprise clients monitor access to keys stored at on HSM and can limit or kill access at any time if access inconsistencies are detected.

The HSM can be security hosted in a number of ways. For example, the HSM can be hosted by the cloud-based platform. In such cases, the HSM is logically separate from other components of the cloud-based platform but accessible to the components via key requests at the behest of a remote enterprise client. Alternatively or additionally, the HSM can be hosted by another distinct cloud-based platform such as, for example, Amazon AWS or by a managed services provider (MSP) such as, for example, Equinox Managed Services.

Additionally, in some embodiments, the enterprise (or remote) client can provide client-side control and configurability of the second layer of key encryption. In such cases, a key management engine and/or the HSM can provide the client-side control and configurability through the use of a rule engine that can process a generated access reason to determine whether or not to encrypt or decrypt (or request encryption or decryption of) a corresponding encryption key based, at least in part, on a set of pre-defined client-configurable rules. Additionally, in various embodiments a kill switch is provided to the client at the HSM and/or the key management engine for facilitating remote kill capabilities.

FIG. 1 illustrates an example diagram of a system having a host server 100 of a cloud service and/or cloud storage accounts with capabilities that facilitate remote key management services.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination or variation of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
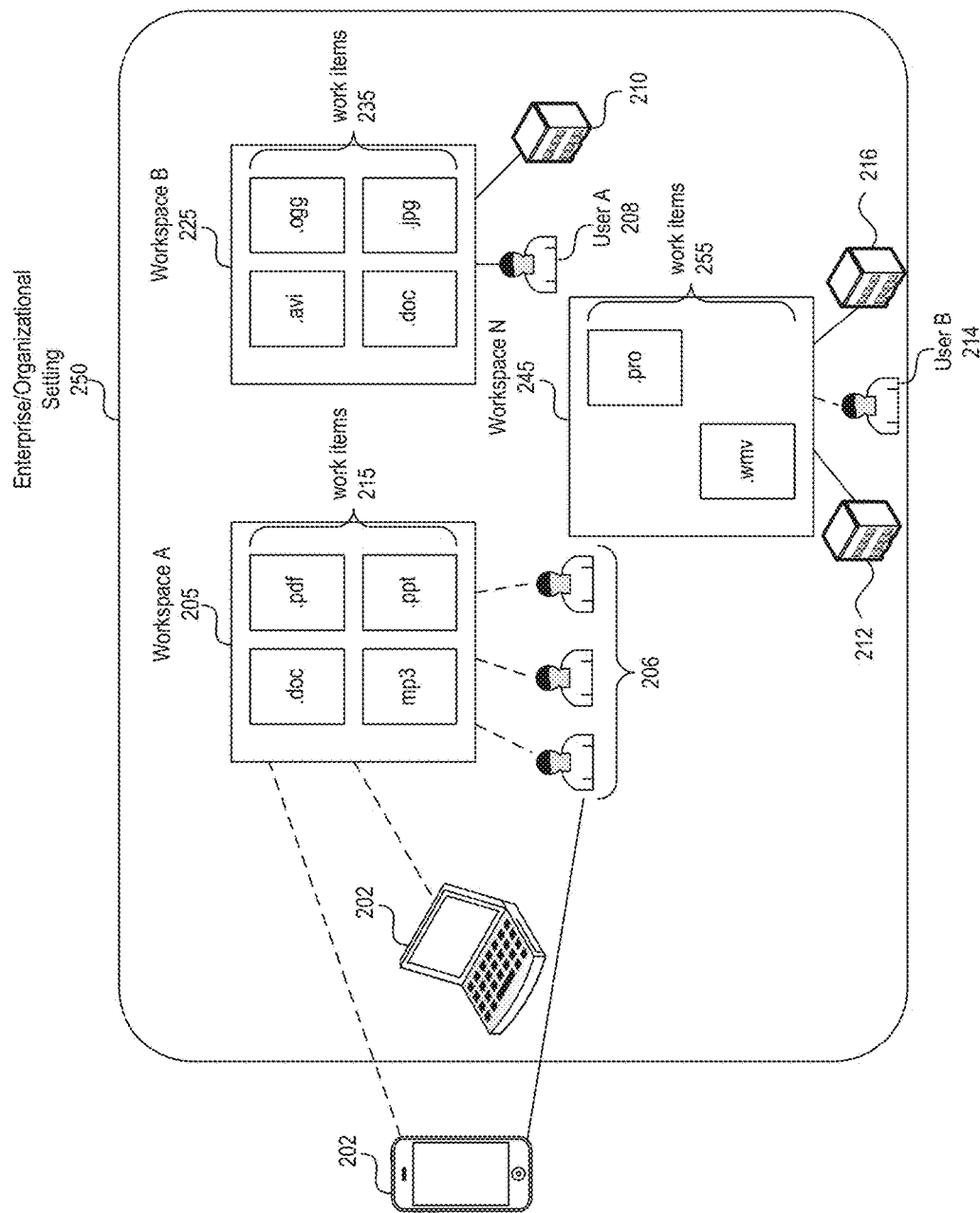
FIG. 2 depicts a diagram of a web-based or online collaboration platform deployed in an enterprise or other organizational setting for organizing work items and workspaces, as one example of a hosted cloud service and/or cloud storage accounts with capabilities that facilitate remote key management services.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, client devices 102 communicate with the host server 100 and/or people search engine 150 over network 106. In general, network 106, over which the client devices 102, the host server 100, and/or people search engine 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

In one embodiment, actions performed on work items or other activities that occur in a workspace can be detected in real time or in near real time. The host server can generate notifications or notification events for one or more of the plurality of activities and select one or more recipients for each notification. Various mechanisms or external messaging applications can then be used to notify users or collaborators, including through the web interface to access the collaboration platform, via email, and/or SMS, for example.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service with capabilities that facilitate remote key management services.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content (content items) downloaded or edited in accordance with the techniques described in the present disclosure can cause notifications to be generated. Such notifications can be sent to relevant users to notify them of actions surrounding a download, an edit, a change, a modification, a new file, a conflicting version, an upload of an edited or modified file.

In one embodiment, in a user interface of the web-based collaboration platform where notifications are presented, users can, via the user interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
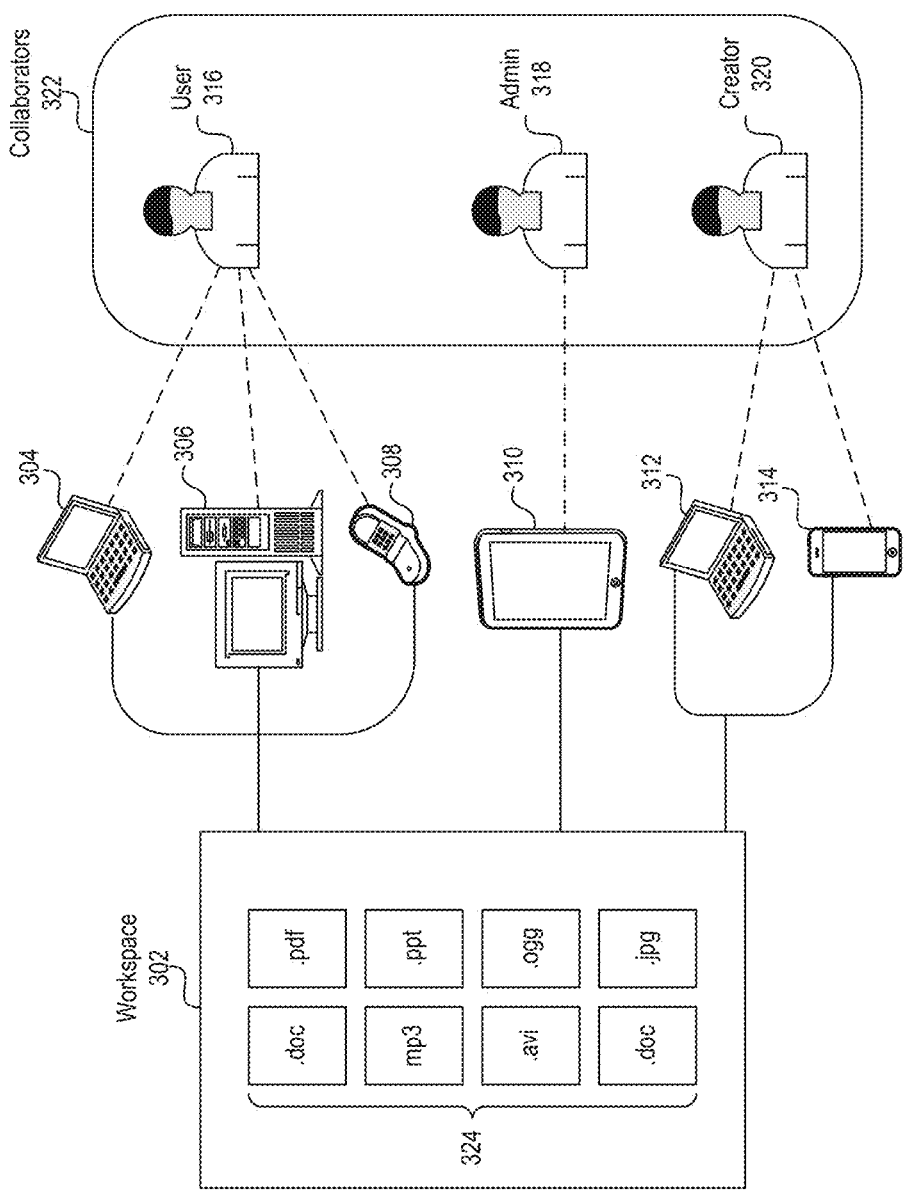
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 (e.g., content items) in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Work items hosted by a collaboration environment (e.g., a cloud-based collaboration environment) can be accessed by users (e.g., users 316, 318, and 320) via multiple different devices (e.g., devices 304-314) for viewing, editing, processing or performing other manipulations on work items. The devices can include applications for accessing a server hosting a cloud-based platform or service or other backend web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism are generally insecure, and any data passed between applications are visible to all other application on a device.

Figure 4A:
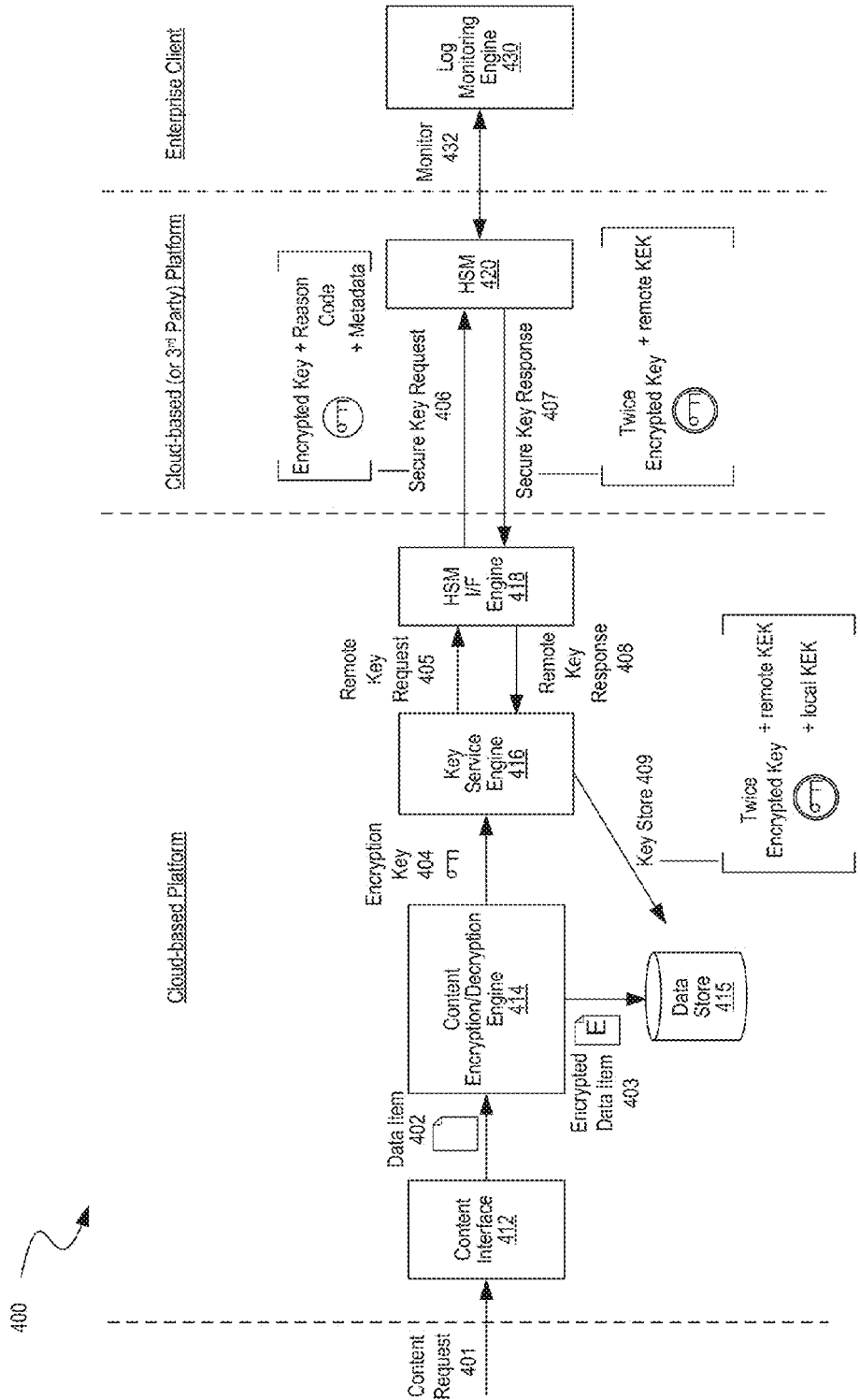
FIG. 4A and FIG. 4B depict example data flow diagrams illustrating operation of components in a collaborative cloud-based environment for facilitating remote key management services responsive to an upload request and an access request, respectively.
Figure 4B:
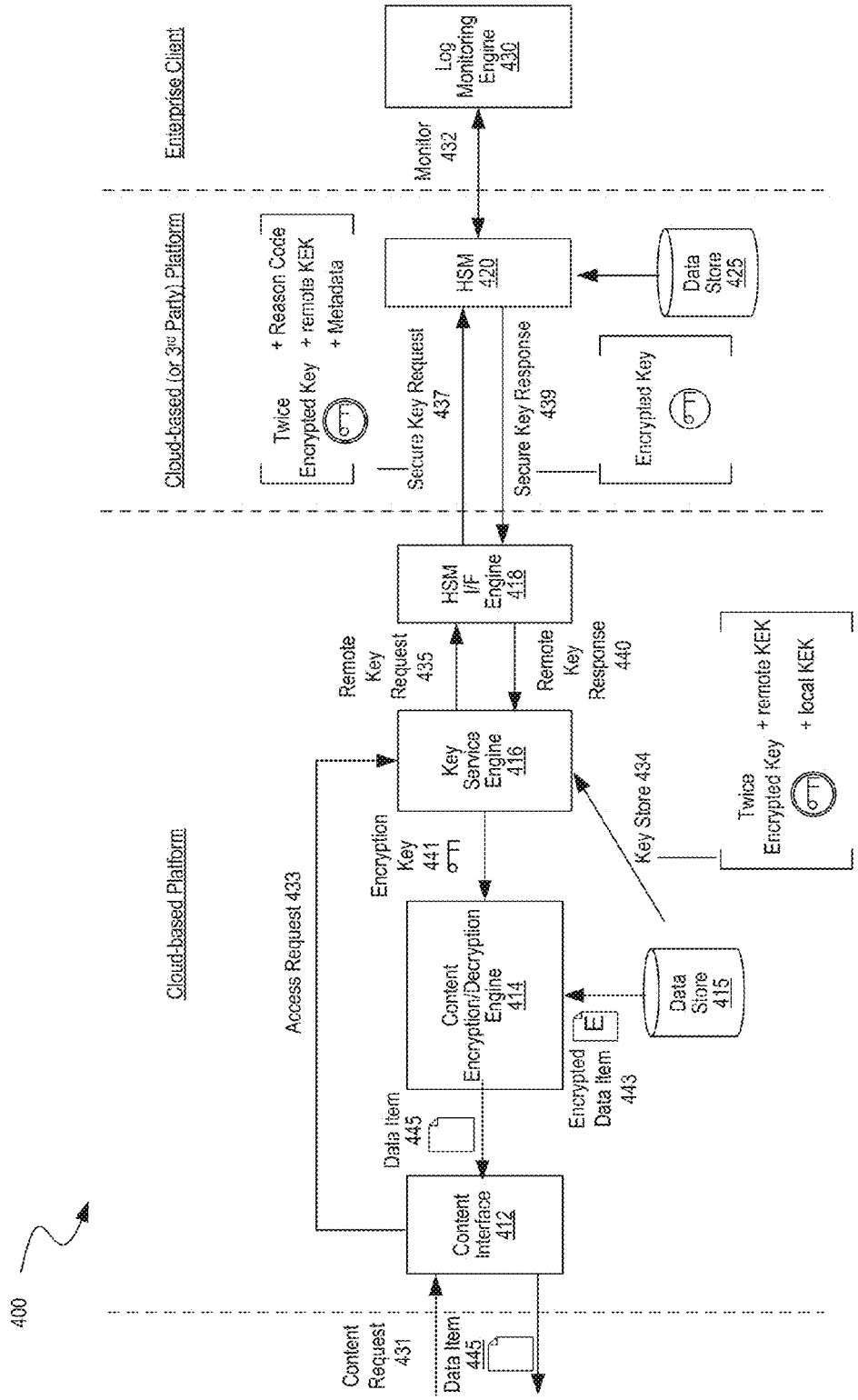

FIGS. 4A and 4B depict example data flow diagrams illustrating operation of components in a collaborative cloud-based environment 400 for facilitating remote key management services responsive to an upload request and an access request, respectively, according an embodiment. More specifically, the examples of FIGS. 4A and 4B illustrate a cloud-based platform configured to provide an enterprise client with remote key management services allowing the enterprise client to have direct control and monitoring capabilities over upload and/or access to data items (e.g., data files in the cloud-based platform).

As shown in the examples of FIGS. 4A and 4B, the cloud-based platform includes a content interface 412, a content encryption/decryption engine 414, a key service engine 416, an HSM interface (I/F) engine 418, and a data store 415. The second cloud-based (or 3rd party) platform includes an HSM 420. The enterprise client includes a log monitoring engine 430. Additional or fewer components/modules/engines are possible at the cloud-based platform, the second cloud-based (or 3rd party) platform and/or the enterprise client.

Referring first to FIG. 4A, which illustrates operation of components in a collaborative cloud-based environment 400 for facilitating remote key management services responsive to an upload request, the cloud-based platform first receives a content request 401 at the content interface 412. The content interface 412 processes the content request 401 to determine that the request comprises a request to upload a data item 402. The content interface then passes data item 402 or an indication thereof to the content encryption/decryption engine 414. The content encryption/decryption engine 414 selects an encryption key 404 and encrypts the data item according to any of a variety of encryption methodologies using the selected encryption key 404 resulting in an encrypted data item 403.

The content encryption/decryption engine 414 then passes the encryption key to the key service engine 416. The encryption/decryption engine 414 can also pass the encrypted data item 403 to the data store 415. Alternatively or additionally, the encrypted data item 403 (or a handle thereto or indicator thereof) can be passed to the key service engine 416. The key service engine 416 can use the encrypted data item 403 (or handle or indicator thereof) to associate one or more key encryption keys with the encrypted data item 403. The one or more key encryption keys can be later associated with and/or otherwise stored with the encrypted data 403 in the data store 415.

Continuing with the example of FIG. 4A, the key service engine 416 selects a local key encryption key (KEK) and uses the local KEK to encrypt the encryption key 404 resulting in an encrypted encryption key. The local KEK may be, for example, selected randomly. The local KEK used to perform the encryption is noted and maintained by the system for later decryption purposes, if necessary.

The key service engine 416 also processes the content (upload) request 401 to identify audit log information such as, for example, metadata and a reason for the content request. The key service engine 416 also generates a code associated with the reason. By way of example and not limitation, the metadata can include: an Internet Protocol (IP) address initiating the request, a user identifier (ID) associated with the request, a file identifier (ID) associated with the request, etc. Other metadata is also possible. By way of example and not limitation, reasons can include: to fulfill an upload data item request, to fulfill a download or access data item request, to fulfill a maintenance request, to perform another action (e.g., to perform a text extraction request), to fulfill backend services (e.g., conversion), etc. Other reasons are also possible and, as discussed, each reason can be coded with reason code.

The key service engine 416 next generates a remote key request 405 and sends the request to the HSM I/F engine 418. The HSM I/F engine 418 initiates a secure key request 406 which includes at least some of the audit log information. As shown in the example of FIG. 4A, the secure key request 406 includes the encrypted encryption key, the generated reason code, and/or identified or generated metadata associated with the content request 401. The secure key request directs the HSM 420 to store the audit log information and sign the audit log information with a secure key. In various embodiments, the audit log information can be included in a free form block of the secure key request 406 to the HSM 420.

In various embodiments, the key service engine 416 and/or the HSM 420 can include a configurable rules processing engine that processes reason codes and/or identified or generated metadata associated with the content requests to determine whether to accept or reject the request based on one or more pre-configured rules. For example, the pre-configured rules can be generated to reject requests with particular reason codes, reject requests from particular IP addresses, reject particular users based on user ID, etc. The contents of an example key service engine 416 are shown and discussed in greater detail with reference to FIG. 5.

When the HSM 420 receives the secure key request 406, the HSM 420 selects a remote KEK and uses the remote KEK to encrypt the encrypted encryption key resulting in a twice encrypted key 408. The HSM 420 can then respond to the secure key request 406 with a secure key response 407. As illustrated, the secure key response 407 can include the twice encrypted key and the remote KEK. Alternatively or additionally, the remote KEK and/or the twice encrypted key can be stored the HSM 420. The contents of an example HSM 420 are shown and discussed in greater detail with reference to FIG. 6.

The HSM I/F engine 418 receives the secure key response 407 from the HSM 420, parses the response to glean relevant information and passes a remote key response 408 to the key service engine 416.

The key service engine 416 subsequently directs the data store to store the twice encrypted key 408, the remote KEK, and the local KEK in data store 415. The twice encrypted key 408, the remote KEK, and the local KEK can be stored and/or otherwise associated with the corresponding encrypted data item 403 in the data store 415. Alternatively, if the remote KEK and/or twice encrypted key are stored remotely, information (e.g., IDs) with respect to the KEK and/or twice encrypted key may be associated with and/or stored with encrypted data item 403.

Referring next to FIG. 4B, which depicts another example data flow diagram illustrating operation of components in a collaborative cloud-based environment 400 for facilitating remote key management services responsive to an access request. The cloud-based platform first receives a content request 431 at the content interface 412. The content interface 412 processes the content request 431 to determine that the request comprises a request to access (e.g., download) a data item 445 and passes access request 433 on to the key service engine 416.

The key service engine 416 first determines whether the requested data item 445 is associated with remote key management functionality. For example, each data item can be associated with an enterprise and the key service engine 416 can identify the enterprise associated with the data item and determine if the enterprise has key management functionality. Alternatively or additionally, an enterprise or client can handle and/or otherwise manage keys on a case-by-case (or item-by-item) basis. In the example of FIG. 4B, the key service engine 416 determines that the requested data item 445 is associated with remote key management functionality.

The key service engine 416 then determines and/or otherwise identifies information associated with data item 445 and accesses and/or otherwise receives or retrieves the information from the data store 415. In the example of FIG. 4B, the information associated with the data item 445 includes a twice encrypted key, a remote KEK and a local KEK. As discussed above, in some embodiments, the remote KEK and/or the twice encrypted key may be stored remotely. The key service engine 416 next processes the content (access) request 431 to identify audit log information such as, for example, metadata and a reason for the content request. The and generates a code associated with the reason. The key service engine 416 then generates a remote key request 435 including the audit log information (e.g., the twice encrypted key, the reason code, the metadata, and/or the remote KEK) and sends the request to the HSM OF engine 418. The contents of an example key service engine 416 are shown and discussed in greater detail with reference to FIG. 5.

The HSM I/F engine 418 initiates a secure key request 437 which includes at least some of the audit log information. As shown in the example of FIG. 4B, the secure key request 437 includes the twice encrypted encryption key, the generated reason code, the remote KEK, and/or identified or generated metadata associated with the content request 431. The secure key request directs the HSM 420 to store the audit log information and sign the audit log information with a secure key. In various embodiments, the audit log information can be included in a free form block of the secure key request 437 to the HSM 420.

As discussed above, the key service engine 416 and/or the HSM 420 can include a configurable rules processing engine that processes the remote key request including the twice encrypted encryption key, the generated reason code, identified or generated metadata associated with the content request, and/or the remote KEK. The remote key service engine 420 processes the reason code and/or the metadata to determine whether to accept or reject the request based on one or more pre-configured rules. As discussed above, rules can be generated to reject requests with particular reason codes, reject requests from particular IP addresses, reject particular users based on user ID, etc. The contents of an example key service engine 416 are shown and discussed in greater detail with reference to FIG. 5.

When the HSM 420 receives the secure key request 437, the HSM 420 decrypts the twice encrypted key using the remote KEK and provides the once encrypted key 439 back to the HSM I/F Engine 418 which parses the response and passes a remote key response 440 on to the key service engine 416. The key service engine 416 receives the once encrypted key and decrypts the once encrypted key using the local KEK resulting in the encryption key 441. The key service engine 416 then provides the encryption key 441 to the content encryption/decryption engine 414 to decrypt the encrypted data item 443 resulting in the data item 445. The content encryption/decryption engine 414 provides the data item 445 to the content interface 412 which, in turn, responds to the content request 431 with the data item 445. As discussed, the contents of an example HSM 420 are shown and discussed in greater detail with reference to FIG. 6.

Figure 5:
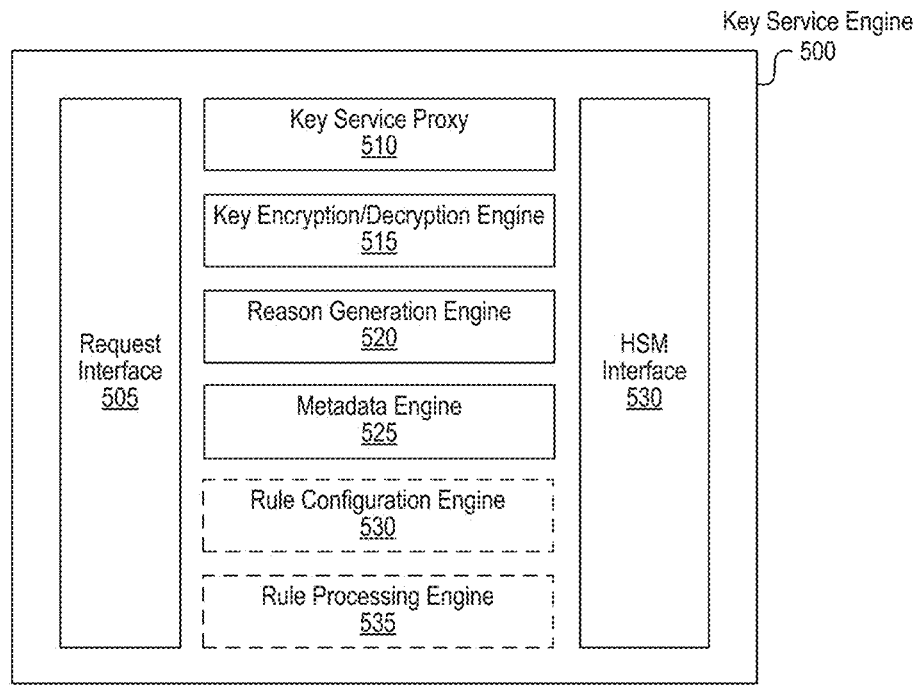
FIG. 5 depicts a block diagram illustrating an example of components in a key service engine for facilitating remote key management services in a collaborative cloud-based environment.

FIG. 5 depicts a block diagram illustrating an example of components in a key service engine 500 for facilitating remote key management services in a collaborative cloud-based environment. The key service engine 500 can be the key service engine 416 of FIGS. 4A and 4B, although alternative configurations are possible.

The key service engine 500 can be part of a web-based or online collaboration environment which can generally be a cloud-based service. The key service engine 500 can include, for example, a request interface 505, a key service proxy 510, a key encryption/decryption engine 515, a reason generation engine 520, a metadata engine 525, a rule configuration engine 535, a rule processing engine 540, and an HSM interface 530. Additional or fewer components/modules/engines can be included in the key service engine 500 and/or each illustrated component. Further, although illustrated as included as part of the key service engine 500, the components/modules/engines can be physically and/or functionally distributed.

The request interface 505 can be configured to communicate with other components of the cloud-based platform. Similarly, the enterprise client interface 530 can be configured to communicate with components of a remote client device (e.g., enterprise client computers or devices).

The request interface 505 and/or the enterprise client interface 530 can be networking modules that enables key service engine 500 to mediate data in a network with entities that are external to key service engine 500, through any known and/or convenient communications protocol supported by the host and the external entity. For example, the request interface 505 and/or the enterprise client interface 530 can be a network interface that can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the key service engine 500 includes the key service proxy 510 which can comprise any device configured to initiate a remote key request responsive to a determination that a data item indicated by a content request is associated with remote key management functionality.

One embodiment of the key service engine 500 includes the key encryption/decryption engine 515 which can provide a first layer of encryption and decryption for an encryption key. During upload requests, as described in FIG. 4A, the key encryption/decryption engine 515 encrypts an encryption key that is selected and used to encrypt the received data item. For example, the key encryption/decryption engine 515 can select a key encryption key to encrypt the encryption key. In one embodiment, the key encryption key is selected randomly, however, the key encryption key may be selected in other manners. Once encryption of the key is complete, the key service engine 500 can store the key encryption key (KEK) in a data store. In one or more embodiments, the KEKs transferred by the components described herein may be key encryption key identifiers (IDs).

During access (or download) requests, as described in FIG. 4B, the key encryption/decryption engine 515 can access a key encryption key from a data store (or memory) and use the key encryption key to decrypt a once encrypted key received responsive to a remote key request to decrypt a twice encrypted key.

One embodiment of the key service engine 500 includes the reason generation engine 520 which can process the content request to identify the reason associated with the content request and responsively generate the corresponding reason code. As discussed above, the reason code enumerates a user behavior performed on the data item in the collaborative cloud-based environment. The audit information is included in a secure key request to the HSM which logs the audit information for monitoring by an enterprise client.

One embodiment of the key service engine 500 includes the metadata engine 525 which can process the received content request to identify metadata associated with the content request. In one embodiment, the remote key request can include the metadata.

One embodiment of the key service engine 500 includes an optional rule configuration engine 530 which can facilitate client configuration of rules. For example, rules can be generated to reject requests with particular reason codes, reject requests from particular IP addresses, reject particular users based on user ID, etc.

One embodiment of the key service engine 500 includes an optional rule processing engine 535 which can process requests including the encrypted encryption key, the generated reason code, and/or identified or generated metadata associated with the content request and processes the reason code and/or the metadata to determines whether to accept or reject the request based on one or more pre-configured rules. For example, rules can be generated to reject requests with particular reason codes, reject requests from particular IP addresses, reject particular users based on user ID, etc.

One embodiment of the key service engine 500 includes the HSM interface 530 which generates the secure requests that direct the HSM, e.g., HSM 420 of FIG. 4, to store the audit log information and sign the audit log information with a secure key. As discussed, in various embodiments, the audit log information can be included in a free form block of the secure key request to the HSM.

Figure 6:
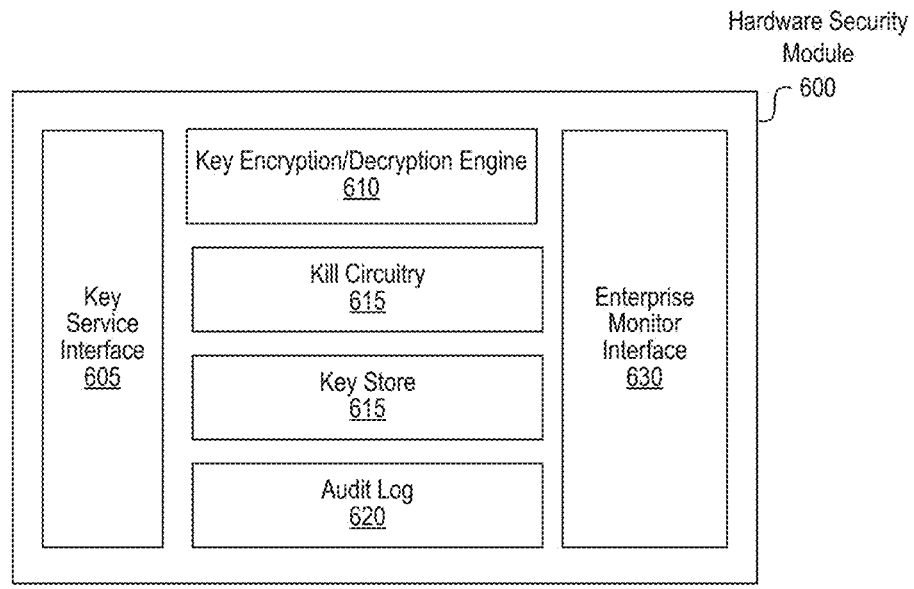
FIG. 6 depicts a block diagram illustrating an example of components in a hardware security module (HSM) for facilitating remote key management services in a collaborative cloud-based environment.

FIG. 6 depicts a block diagram illustrating an example of components in an HSM 600 for facilitating remote key management services in a collaborative cloud-based environment. The HSM 600 can be the HSM 420 of FIGS. 4A and 4B, although alternative configurations are possible.

The HSM 600 can be any physical computing device that safeguards and manages keys. In various embodiments, the HSM 600 can comprise a plug-in card or an external device that attaches directly to a computer or network server. The HSM 600 can be security hosted in a number of ways. For example, the HSM 600 can be hosted by the primary cloud-based platform (i.e., the cloud-based platform on which the key service engine resides). In such cases, the HSM 600 is logically separate from other components of the cloud-based platform but accessible to the components via key requests at the behest of a remote enterprise client. Alternatively or additionally, the HSM 600 can be hosted by another distinct cloud-based platform such as, for example, Amazon AWS or by a managed services provider (MSP) such as, for example, Equinox Managed Services.

In various embodiments, the HSM 600 can be part of a web-based or online collaboration environment which can generally be a cloud-based service. The HSM 600 can include, for example, a key service interface 605, a key encryption/decryption engine 610, kill circuitry 615, a key store 620, an audit log 625, and a client configuration interface 630. Additional or fewer components/modules/engines can be included in the HSM 600 and/or each illustrated component. Moreover, although illustrated as included as part of the HSM 600, the components/modules/engines can be physically and/or functionally distributed.

The key service interface 605 can be configured to communicate with components of the cloud-based platform such as, for example, the key service engine 500 of FIG. 5. Similarly, the enterprise monitor interface 630 can be configured to allow clients (e.g., enterprise client computers or devices) to monitor audit logs.

The key service interface 605 and/or the enterprise monitor interface 630 can be networking modules that enables the HSM 600 to mediate data in a network with entities that are external to HSM 600, through any known and/or convenient communications protocol supported by the host and the external entity. For example, the key service interface 605 and/or the enterprise monitor interface 630 can be a network interface that can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," "a handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the HSM 600 includes the key encryption/decryption engine 610 which can provide a second layer of encryption and decryption for an encryption key at a remote client device. During remote encryption requests, as described in FIG. 4A, the key encryption/decryption engine 610 encrypts a received once encrypted encryption key using a remote key encryption key. In one embodiment, the key encryption/decryption engine 610 can then provide the twice encrypted encryption key and/or the remote KEK to the key service engine of the cloud-based platform. During remote decryption request, as described in FIG. 4B, the key encryption/decryption engine 610 decrypts a twice encrypted encryption key using a remote key encryption key.

One embodiment of the HSM 600 includes kill circuitry 615 which can be set regardless of the pre-configured rules and reasons. The kill circuitry can include a programmable kill switch that, once set, rejects the remote key requests regardless of the pre-configured rules and the reasons. Additionally, the kill circuitry 615 can include functionality to destroy contents in the event that the system detects tampering with the HSM 600.

One embodiment of the HSM 600 includes a key store 615 and an audit log 620 configured to store keys and log audit information, respectively.

Figure 7:
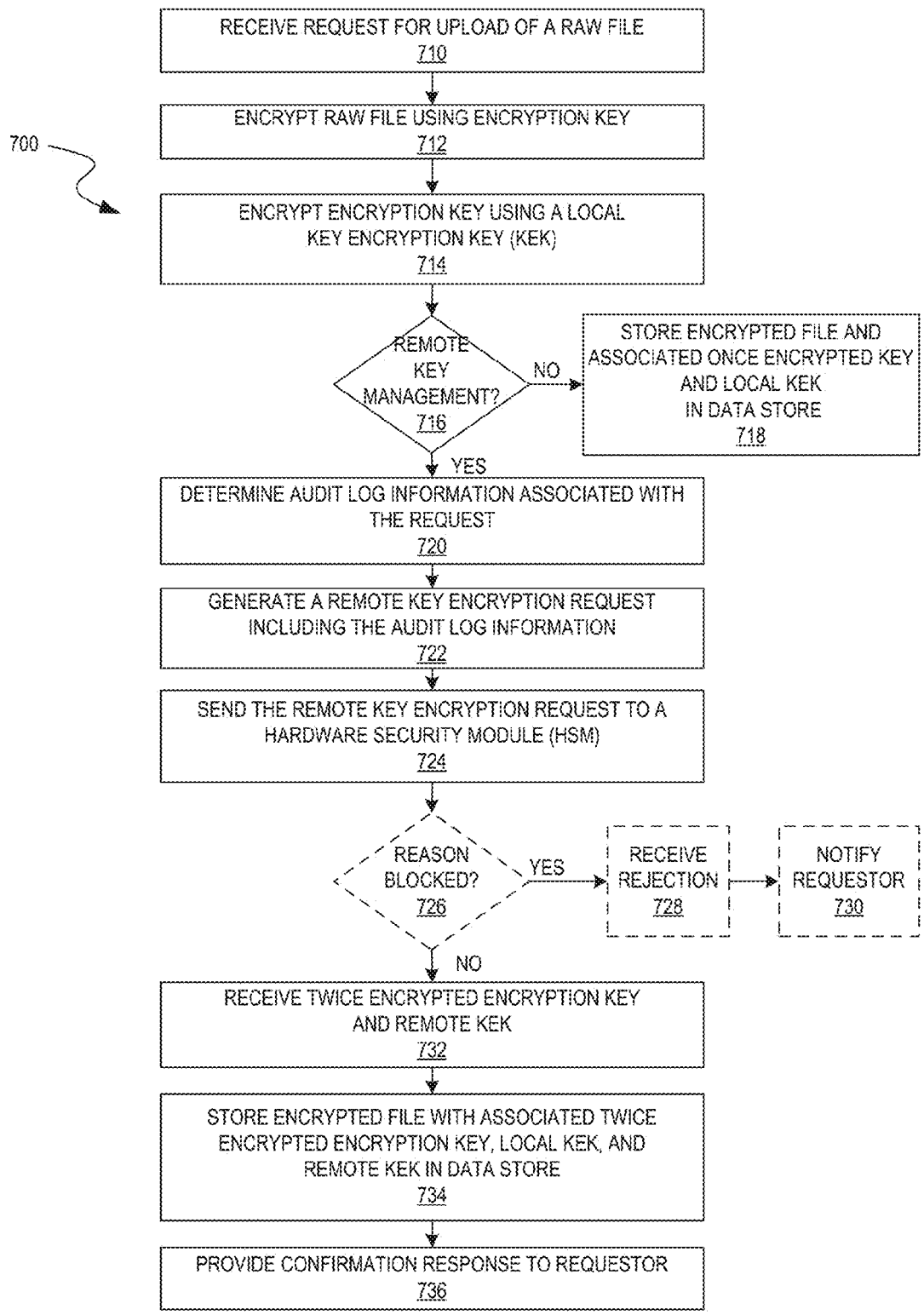
FIG. 7 depicts a flow diagram illustrating an example process for facilitating remote key management services in a collaborative cloud-based environment responsive to an upload request.

FIG. 7 depicts a data flow diagram 700 illustrating example process 700 for facilitating remote key management services in a collaborative cloud-based environment responsive to a content item upload request. Components of a cloud-based platform such as, for example, the cloud-based platform of FIGS. 4A and 4B can, among other functions, perform the example process 700.

To begin, at process 710, the cloud-based platform receives a request for upload of a raw file (e.g., content or data item). The request for upload can be received from another machine internal to the collaborative cloud-based environment, a web application server, an external user (collaborator) machine, etc. In one embodiment, a content interface such as, for example, the content interface 412 of FIGS. 4A and 4B can receive the request for upload at the cloud-based platform. At process 712, the cloud-based platform encrypts a raw file using an encryption key. In one embodiment, a content encryption/decryption engine such as, for example, the encryption/decryption engine 414 of FIGS. 4A and 4B can encrypt the raw file.

At process 714, the cloud-based platform encrypts the encryption key using a local key encryption key (KEK). In one embodiment, a key service engine such as, for example, the key service engine 416 of FIGS. 4A and 4B can encrypt the encryption key using the local KEK. The key service engine can select a local KEK randomly or in any other known manner.

At decision process 716, the cloud-based platform determines if the content (upload) request and/or the particular content item is associated with remote key management functionality. In one embodiment, a key service engine such as, for example, the key service engine 416 of FIGS. 4A and 4B can make the remote key management determination. For example, each data item can be associated with an enterprise and the key service engine can identify the enterprise associated with the data item and determine if the enterprise has key management functionality. Alternatively or additionally, an enterprise or client can handle and/or otherwise manage keys on a case-by-case (or item-by-item) basis. That is, the key service engine can determine that the requested data item is associated with remote key management functionality.

If the content (upload) request and/or the particular content item is not associated with remote key management functionality then, at process 718, the cloud-based platform stores the encrypted content or data item and associated once encrypted encryption key and local KEK in a data store. However, if the content (upload) request and/or the particular content item is associated with remote key management functionality then, at process 720, the cloud-based platform identifies and/or otherwise determines audit log information associated with the request. For example, the audit log information can include metadata associated with the content request and a reason code associated with the content request. In one embodiment, a key service engine such as, for example, the key service engine 416 of FIGS. 4A and 4B can identify the metadata associated with the content request and determine a reason and generate a corresponding reason code as described herein.

In one embodiment, identifying the metadata associated with the content request includes identifying and/or otherwise determining ancillary information associated with the content request. For example, the metadata can include, but is not limited to, an Internet Protocol (IP) address initiating the request, a user identifier (ID) associated with the request, a file identifier (ID) associated with the request, etc. Other metadata is also possible.

In one embodiment, determining the reason code includes first identifying a reason for the content request and subsequently generating a code associated with the reason. By way of example and not limitation, reasons can include: to fulfill an upload data item request, to fulfill a download or access data item request, to fulfill a maintenance request, to perform another action (e.g., to perform a text extraction request), to fulfill backend services, etc. Other reasons are also possible. Each reason can be coded with reason code.

At process 722, the cloud-based platform generates a remote key encryption request including at least some of the audit log information. At process 724, the cloud-based platform sends the remote key request to encrypt the encrypted encryption key to a hardware security module. As discussed herein the remote key request can include the encrypted encryption key (also referred to as the once encrypted encryption key herein), identified or generated metadata associated with the content request, and the generated reason code. A key service engine such as, for example, the key service engine 416 of FIGS. 4A and 4B can initiate the remote key request.

At a decision process 726, the cloud-based platform may optionally check if the reason is ok. For example, the cloud-based platform can make the determination of whether the reason is acceptable. More specifically, a rules processing engine such as, for example, the rules processing engine 535 of FIG. 5 can make this determination. If the reason is not acceptable (i.e., the reason is rejected), then, at process 728, the cloud-based platform receives a rejection and, optionally at process 730, notifies the content request requestor (e.g., the system or user initiating the content request).

At process 732, the cloud-based platform receives a twice encrypted encryption key and a remote KEK and, at process 734, stores the encrypted file with the associated twice encrypted encryption key, the local KEK, and the remote KEK. Lastly, at process 736, the cloud-based platform optionally provides a confirmation response to the content item requestor. In one embodiment, the confirmation could occur at any time subsequent to the reception of the content request.

Figure 8:
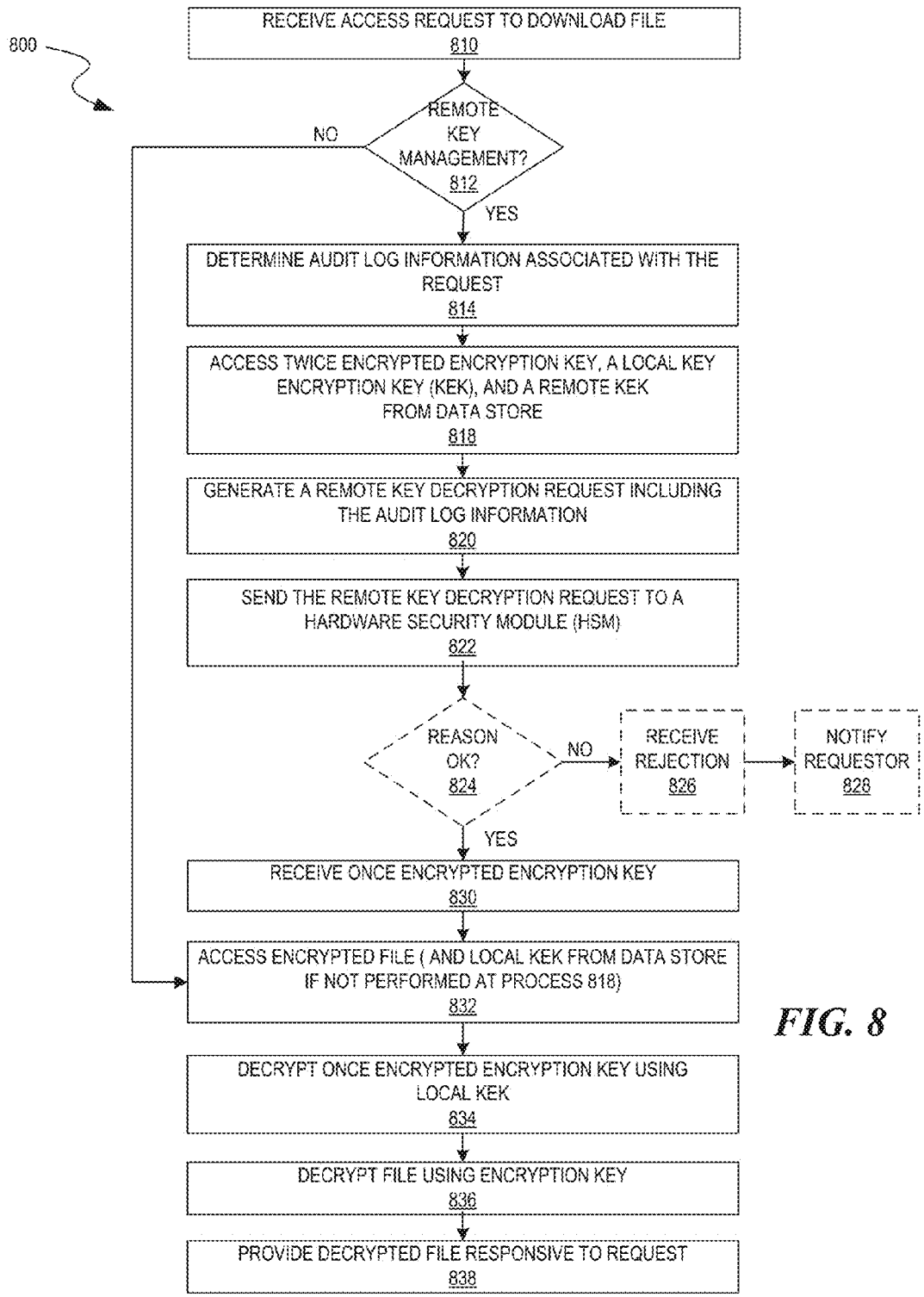
FIG. 8 depicts a flow diagram illustrating an example process for facilitating remote key management services in a collaborative cloud-based environment responsive to an access request.

FIG. 8 depicts a data flow diagram 800 illustrating example process 800 for facilitating remote key management services in a collaborative cloud-based environment responsive to a content item access request. Components of a cloud-based platform such as, for example, the cloud-based platform of FIGS. 4A and 4B can, among other functions, perform the example process 800.

To begin, at process 810, the cloud-based platform receives an access request to download a file (e.g., content or data item). The request for access can be received from another machine internal to the collaborative cloud-based environment, a web application server, an external user (collaborator) machine, etc. In one embodiment, a content interface such as, for example, the content interface 412 of FIGS. 4A and 4B can receive the request for upload at the cloud-based platform.

At decision process 812, the cloud-based platform determines if the content (access) request and/or the particular content item is associated with remote key management functionality. In one embodiment, a key service engine such as, for example, the key service engine 416 of FIGS. 4A and 4B can make the remote key management determination. For example, each data item can be associated with an enterprise and the key service engine can identify the enterprise associated with the data item and determine if the enterprise has key management functionality. Alternatively or additionally, an enterprise or client can handle and/or otherwise manage keys on a case-by-case (or item-by-item) basis. That is, the key service engine can determine that the requested data item is associated with remote key management functionality.

If the content (access) request and/or the particular content item is not associated with remote key management functionality then the process continues at process 832 below. However, if the content (access) request and/or the particular content item is associated with remote key management functionality then, at process 814, the cloud-based platform the cloud-based platform identifies and/or otherwise determines audit log information associated with the request. For example, the audit log information can include a reason code associated with the content request. In one embodiment, a key service engine such as, for example, the key service engine 416 of FIGS. 4A and 4B can identify the metadata associated with the content request and determine a reason and generate a corresponding reason code as described herein.

In one embodiment, identifying the metadata associated with the content request includes identifying and/or otherwise determining ancillary information associated with the content request. For example, the metadata can include, but is not limited to, an Internet Protocol (IP) address initiating the request, a user identifier (ID) associated with the request, a file identifier (ID) associated with the request, etc. Other metadata is also possible.

In one embodiment, determining the reason code includes first identifying a reason for the content request and subsequently generating a code associated with the reason. By way of example and not limitation, reasons can include: to fulfill an upload data item request, to fulfill a download or access data item request, to fulfill a maintenance request, to perform another action (e.g., to perform a text extraction request), to fulfill backend services, etc. Other reasons are also possible. Each reason can be coded with reason code.

At process 818, the cloud-based platform accesses a twice encrypted encryption key, a local KEK, and a remote KEK from a data store. At process 820, the cloud-based platform generates a remote key request including the audit log information to decrypt the encrypted encryption key. As discussed herein the audit log information can include the twice encrypted encryption key, identified or generated metadata associated with the content request, the generated reason code, and the remote KEK. A key service engine such as, for example, the key service engine 416 of FIGS. 4A and 4B can initiate the remote key request. At process 822, the cloud-based platform sends the key decryption request to a hardware security module (HSM).

At a decision process 824, the cloud-based platform may optionally check if the reason is ok. For example, the cloud-based platform can make the determination if the reason is acceptable. More specifically, a rules processing engine such as, for example, the rules processing engine 535 of FIG. 5 can make this determination. If the remote enterprise client system determines that the reason is not acceptable (i.e., the reason is rejected), then, at process 826, the cloud-based platform receives a rejection and, optionally at process 828, notifies the content request requestor (e.g., the system or user initiating the content request).

At process 830, the cloud-based platform receives a once encrypted encryption key and, at process 832, accesses the encrypted data item associated with the content request from the data store. In various embodiments, the cloud-based platform can also access a local KEK from the data store if the local KEK was not previously accessed at process 818.

At process 834, the cloud-based platform decrypts the encrypted data encryption key using the local KEK.

At process 836, the cloud-based platform decrypts the encrypted data item using the unencrypted encryption key. Lastly, the cloud-based platform provides the decrypted file content item requestor responsive to the content request.

Figure 9:
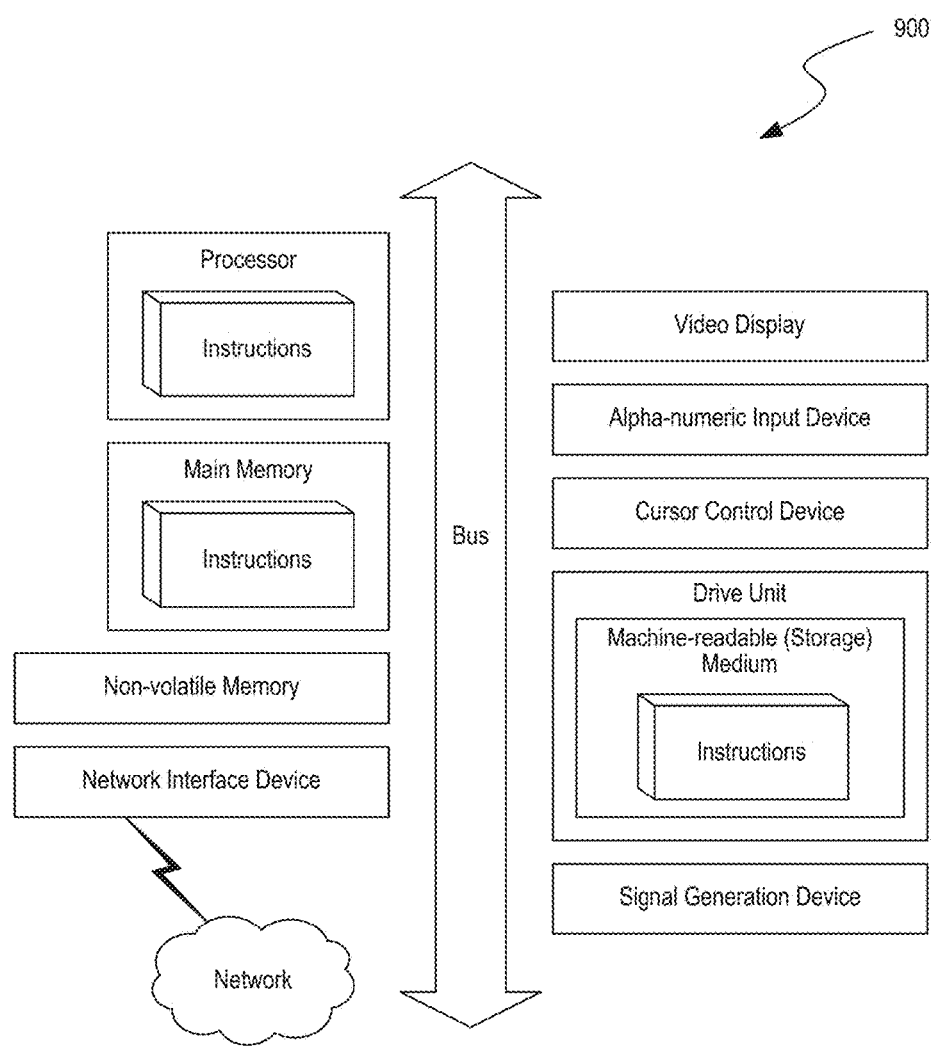
FIG. 9 depicts a diagrammatic representation of a machine in the example form of a computer system within which a set of instructions, for causing the machine to perform any one or more of the methodologies discussed herein, may be executed.

FIG. 9 illustrates a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 700 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for facilitating remote key management services in a collaborative cloud-based environment, the method comprising:
   processing a data item indicated by a content request to determine that the data item is associated with remote key management functionality;
   identifying audit log information associated with the content request, wherein the audit log information comprises a reason code enumerating a reason associated with the content request, wherein the reason comprises at least one of: accessing a data item request, fulfilling a maintenance request, performing a text extraction request, or fulfilling backend services;
   initiating a secure key request by a HSM interface engine to a hardware security module (HSM), wherein the secure key request comprises the audit log information; and
   determining whether to accept or reject the content request by processing the reason code from the secure key request based at least in part on one or more pre-configured rules by the HSM, wherein the HSM is located on a second client device that is remote from the HSM interface engine located on a first client device, the secure key request sent across a network from the first client device to the second client device for determining whether to accept or reject the content request based at least in part on the reason code.

2. The method of claim 1, wherein the secure key request directs the HSM to store the audit log information.

3. The method of claim 2, wherein the secure key request further directs the HSM to sign the audit log information with a secure key.

4. The method of claim 1, wherein the audit log information is included in a free form block of the secure key request to the HSM.

5. The method of claim 1, wherein the HSM is hosted by the collaborative cloud-based environment but the audit log information is inaccessible via the collaborative cloud-based environment.

6. The method of claim 1, wherein the HSM is hosted by a second collaborative cloud-based environment distinct from the collaborative cloud-based environment.

7. The method of claim 1, wherein the HSM is hosted by a managed services provider.

8. The method of claim 1, wherein the HSM provides access to the collaborative cloud-based environment and the collaborative cloud-based environment is distinct from a client enterprise that owns the HSM.

9. The method of claim 1, wherein the content request comprises an upload request and wherein the secure key request includes a request to encrypt an encrypted encryption key.

10. The method of claim 1, wherein the content request comprises an access request and wherein the secure key request includes a request to decrypt a twice encrypted encryption key.

11. A system for facilitating remote key management services in a collaborative cloud-based environment, the system comprising: one or more processors;
a memory unit having instructions stored thereon which, when executed by the one or more processors, causes the system to:
process a data item indicated by a content request to determine that the data item is associated with remote key management functionality;
identify audit log information associated with the content request, wherein the audit log information comprises a reason code enumerating a reason associated with the content request, wherein the reason comprises at least one of: accessing a data item request, fulfilling a maintenance request, performing a text extraction request, or fulfilling backend services;
initiate a secure key request by a HSM interface engine to a hardware security module (HSM), wherein the secure key request comprises the audit log information; and
determine whether to accept or reject the content request by processing the reason code from the secure key request based at least in part on one or more pre-configured rules by the HSM, wherein the HSM is located on a second client device that is remote from the HSM interface engine located on a first client device, the secure key request sent across a network from the first client device to the second client device for determining whether to accept or reject the content request based at least in part on the reason code.

12. The system of claim 11, wherein the secure key request directs the HSM to store the audit log information.

13. The system of claim 12, wherein the secure key request further directs the HSM to sign the audit log information with a secure key.

14. The system of claim 11, wherein the instructions, when executed by the one or more processors, further causes the system to:
format the audit log information for a free form block of the secure key request to the HSM, wherein the audit log information is included in the free form block of the secure key request to the HSM.

15. The system of claim 11, wherein the HSM is hosted by the collaborative cloud-based environment but the audit log information is inaccessible via the collaborative cloud-based environment.

16. The system of claim 11, wherein the HSM is hosted by a second collaborative cloud-based environment distinct from the collaborative cloud-based environment.

17. The system of claim 11, wherein the HSM is hosted by a managed services provider.

18. The system of claim 11, wherein the HSM provides access to the collaborative cloud-based environment and the collaborative cloud-based environment is distinct from a client enterprise that owns the HSM.

19. The system of claim 11, wherein the content request comprises an upload request and wherein the secure key request includes a request to encrypt an encrypted encryption key.

20. The system of claim 11, wherein the content request comprises an access request and wherein the secure key request includes a request to decrypt a twice encrypted encryption key.

21. A system for facilitating remote key management services in a collaborative cloud-based environment, the system comprising:
a processor;
a key service proxy device configured to initiate a secure key request responsive to a determination that a data item indicated by a content request is associated with remote key management functionality, wherein the secure key request comprises a reason code enumerating a reason associated with the content request, wherein the reason comprises at least one of: accessing a data item request, fulfilling a maintenance request, performing a text extraction request, or fulfilling backend services;
a reason engine configured to determine a reason code associated with the content request, wherein determining the reason code comprises directing the processor to identify a reason associated with the content request and responsively generate the reason code associated with the content request;
a hardware security interface engine configured to format the secure key request according to a particular hardware security module (HSM); and
the HSM configured to determine whether to accept or reject the content request by processing the reason code from the secure key request based at least in part on one or more pre-configured rules by the HSM, wherein the HSM is located on a second client device that is remote from the key service proxy device located on a first client device, the secure key request sent across a network from the first client device to the second client device for determining whether to accept or reject the content request based at least in part on the reason code.

22. The system of claim 21, wherein the reason code is included in a free form block of the secure key request.

23. The system of claim 21, wherein the secure key request directs the HSM to log the reason code.

24. The system of claim 23, wherein an enterprise client is provided an interface for monitoring the log.

* * * * *